(12) United States Patent
Covic et al.

(10) Patent No.: US 10,985,574 B2
(45) Date of Patent: Apr. 20, 2021

(54) RESONANT POWER TRANSFER

(71) Applicants: Auckland UniServices Limited, Auckland (NZ); Grant Anthony Covic, Mount Albert (NZ); John Talbot Boys, Takapuna (NZ)

(72) Inventors: Grant Anthony Covic, Mount Albert (NZ); John Talbot Boys, Takapuna (NZ)

(73) Assignee: Auckland UniServices Limited, Auckland (NZ)

(*) Notice: Subject to any disclaimer, the term of this patent is extended or adjusted under 35 U.S.C. 154(b) by 148 days.

(21) Appl. No.: 16/077,219

(22) PCT Filed: Feb. 10, 2017

(86) PCT No.: PCT/NZ2017/050014
§ 371 (c)(1),
(2) Date: Aug. 10, 2018

(87) PCT Pub. No.: WO2017/138821
PCT Pub. Date: Aug. 17, 2017

(65) Prior Publication Data
US 2019/0036348 A1 Jan. 31, 2019

(30) Foreign Application Priority Data
Feb. 11, 2016 (NZ) .................................. 716869

(51) Int. Cl.
*H02J 5/00* (2016.01)
*H02J 50/12* (2016.01)
(Continued)

(52) U.S. Cl.
CPC ............... *H02J 5/005* (2013.01); *H02J 5/00* (2013.01); *H02J 7/025* (2013.01); *H02J 50/00* (2016.02);
(Continued)

(58) Field of Classification Search
CPC .... H02J 5/00; H02J 5/005; H02J 7/025; H02J 50/00; H02J 50/12; H02M 1/4208; H02M 3/33592
(Continued)

(56) References Cited

U.S. PATENT DOCUMENTS 6,388,896 B1    5/2002  Cuk
6,400,579 B2    6/2002  Cuk
(Continued)

FOREIGN PATENT DOCUMENTS

WO    WO-2017138821 A1    8/2017

OTHER PUBLICATIONS

"International Application No. PCT/NZ2017/050014, International Search Report and Written Opinion dated Apr. 13, 2017", (Apr. 13, 2017), 9 pgs.
(Continued)

*Primary Examiner* — Hal Kaplan
(74) *Attorney, Agent, or Firm* — Schwegman Lundberg & Woessner, P.A.

(57) ABSTRACT

The present invention relates to a current multiplier primarily in the field of power conversion. The invention relates to a controlled current multiplier with a resonant winding to assist with, for example, power conversion. In particular, but not solely, the invention may broadly consist in a current multiplier comprising: a primary winding associated with a power source; a secondary winding associated with a load; a resonant winding associated with a capacitance; and a control means for controlling an output of the secondary winding to the load, the control means associated with the primary or resonant winding. This allows, for instance, control of the high current output to be placed on a low current winding.

20 Claims, 5 Drawing Sheets

(51) Int. Cl.
 H02J 50/00    (2016.01)
 H02J 7/02     (2016.01)
 H02M 1/42     (2007.01)
 H02M 3/335    (2006.01)
(52) U.S. Cl.
 CPC .......... H02J 50/12 (2016.02); H02M 1/4208 (2013.01); H02M 3/33592 (2013.01)
(58) Field of Classification Search
 USPC ........................................................ 307/104
 See application file for complete search history.

(56) References Cited

U.S. PATENT DOCUMENTS

2006/0190511 A1* 8/2006 Corum ..................... H03H 7/48
                                                         708/200
2009/0302688 A1   12/2009 Boys

OTHER PUBLICATIONS

"International Application No. PCT/NZ2017/050014, International Preliminary Report on Patentability dated Aug. 23, 2018", (Aug. 23, 2018), 6 pgs.

* cited by examiner

RESONANT POWER TRANSFER

PRIORITY CLAIM TO RELATED APPLICATIONS

This application is a U.S. national stage filing under 35 U.S.C. § 371 from International Application No. PCT/NZ2017/050014, filed on 10 Feb. 2017, and published as WO2017/138821 on 17 Aug. 2017, which claims the benefit under 35 U.S.C. 119 to New Zealand Application No. 716869, filed on 11 Feb. 2016, the benefit of priority of each of which is claimed herein, and which applications and publication are hereby incorporated herein by reference in their entirety.

FIELD OF THE INVENTION

The present invention relates to a current multiplier. More particularly the invention relates to a controlled current multiplier with a resonant winding to assist with, for example, power conversion. The invention may find application in a number of fields, one of which is inductive, or wireless, power transfer systems.

BACKGROUND

Figure 1:
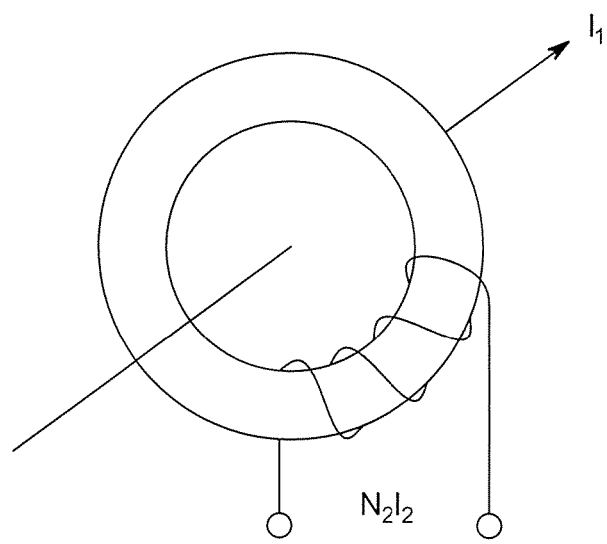

In the instrumentation of power electronics circuits a device of considerable use is the prior art current transformer shown in FIG. 1. Here a core with high relative permeability is wound with a secondary winding N2 to measure the current in a wire with current I1 intersecting the core. In practice a single turn winding is almost always used for I1 but a multi-turn winding is used for the output current I2. The technique is useful as the output current from N2 is a scaled wide-bandwidth isolated low-voltage copy of I1. The multi-turn winding usually extends all around the core to get the maximum possible usable flux in the core with minimal leakage flux. So if N2 is 100 for a single turn primary then I2 will be the primary current I1 divided by 100, assuming that the burden (Load resistor) on N2 is relatively small—typically 5 Ohms. These transformers are well known and widely used for instrumentation purposes but they are not suited to power conversion applications because the cores are typically minimal and cannot support high voltage windings.

In power electronics applications there is a need for apparatus that can convert from one current to another with small high current windings, and different transformer ratios—100:1 is clearly not suitable for all applications. There is also a need for apparatus that can work at high frequencies with different, easily changed, turns-ratios and high power levels. This need cannot be addressed by present current transformer technology

OBJECTS OF THE INVENTION

It is an object of the invention to provide a current multiplier which will at least go some way to overcoming disadvantages of existing systems, or which will at least provide a useful alternative to existing systems.

It is an object of the invention to provide a current multiplier which uses a resonant circuit to improve the rectification of the current multiplier.

It is an object of the invention to provide a current multiplier which allows a control signal to be applied at a low voltage point of the circuit.

Further objects of the invention will become apparent from the following description.

SUMMARY OF INVENTION

Accordingly in one aspect the invention may broadly be said to consist in a current multiplier, the current multiplier comprising:
  a primary winding associated with a power source;
  a secondary winding associated with a load;
  a resonant winding associated with a capacitance; and
  a control means for controlling an output of the secondary winding to the load, the control means associated with the primary or resonant winding.

Preferably the windings are wound around a permeable material or core. Preferably the core comprises, at least in part, a magnetically permeable material. Preferably the core is a ferrimagnetic material, such as a ferrite.

Preferably the core is substantially toroidal in shape. Preferably the core comprises a gap. Preferably the gap is an air gap. Alternatively the gap comprises a low permeability material. Alternatively the core comprises a partial gap. In one embodiment the gap may be adapted to allow a coil of the secondary winding to pass through. Preferably the gap is substantially the same size as the wire of the secondary winding.

Preferably the secondary has five or fewer turns to supply a high current load. More preferably the secondary has two or fewer turns. Most preferably the secondary has one turn.

Preferably, at least two of, or each of, the primary, secondary and resonant windings are spaced apart from one another. Preferably the primary, secondary and resonant windings do not overlap.

Preferably the secondary winding comprises rectification means. Preferably the secondary winding comprises an inductor.

Preferably the winding of the resonant coil is chosen to provide an appropriate electrical characteristic. Preferably this is a resonant frequency. Preferably the resonant winding comprises an inductance tuned by a single capacitor.

In one embodiment the resonant coil comprises an integrator.

Preferably a further winding may be associated with the coil. The winding may be a primary, secondary or resonant winding.

Preferably the power source is a secondary or pick-up of an inductive power transfer (IPT) system. Preferably the power source has a current source characteristic.

Preferably the secondary comprises a resonant circuit. Preferably the resonant circuit operates at a substantially fixed frequency. Preferably the frequency is 1 to 100 kHz. More preferably the frequency is 5 to 20 kHz. Preferably the resonant circuit is parallel tuned.

Preferably the control means comprises a switching means.

Preferably the control means is adapted to control the power transfer between the secondary winding and an associated primary of the multiplier system.

Preferably the control means is associated with either one of, or both, the primary and/or resonant winding. Preferably the control means is associated with a switching means.

Preferably the switching means, when associated with the resonant winding, comprises a rectification means.

Preferably the secondary winding and the resonant winding have a common ground. Preferably the control means is adapted to control the output of the secondary winding to the load by switching the resonant winding.

Preferably the control means is adapted based on the impedance reflected by the current multiplier.

Preferably the resonant winding is adapted to add to the resonant circuit of the primary winding.

Preferably the impedance of the resonant circuit is adapted to select a resonant frequency of the current multiplier.

Preferably the flux in the core, or voltage to the windings, varies with time.

According to a second aspect, the invention may broadly be said to consist in a method of controlling a current multiplier, the current multiplier comprising a primary, resonant and secondary coil, the method comprising the steps:
- obtaining an electrical characteristic associated with the secondary winding; and
- controlling a switch means associated with the primary or resonant winding.

Preferably the secondary and the primary or resonant coil have a common ground.

Preferably the electrical characteristic is a current or voltage.

Preferably the electrical characteristic is a measure of the power supplied to the load.

Preferably the current multiplier comprises a ferro- or ferri-magnetic material such as ferrite, or another magnetically permeable material.

Preferably the switching means is a switch.

According to a third aspect, the invention may broadly be said to consist in a rectifier for supplying DC power to a load; the rectifier comprising:
- a pick-up coil adapted to associate with an Inductive Power Transfer (IPT) primary;
- a compensation network adapted to resonate with the pick-up coils; and
- a current multiplier comprising:
  - a primary coil associated with the pick-up coil and compensation network
  - a resonant coil comprising an impedance; and
  - a secondary coil comprising a rectification means and associated with the load; and
- Wherein the resonant coil provides a store of energy to the current multiplier.

Preferably the energy stored is resonant energy.

According to a fourth aspect, the invention may broadly be said to consist in a pick-up for an Inductive Power Transfer (IPT) system, the pickup comprising:
- a pick-up coil adapted to associate with an IPT primary;
- a compensation network adapted to resonate with the pick-up coils; and
- a current multiplier comprising:
  - a primary winding associated with the pick-up coil and compensation network
  - a resonant winding comprising an impedance; and
  - a secondary winding comprising a rectification means and associated with a load; and
- Wherein the pick-up is adapted to receive power from an associated IPT primary and supply a DC output to the load.

Preferably the impedance is a tuning capacitor.

Preferably the IPT system comprises a control means for controlling the output received by the load.

Preferably the control means is associated with the primary or resonant winding.

Preferably the control means comprises a decoupling controller across the output of the compensation network to regulate the power to the load or shut the circuit down.

Preferably or alternatively the circuit comprises a control means across the resonant coil.

The preferable aspects of the invention described above should be interpreted as applying to any one or more of the aspects of the invention provided.

The disclosed subject matter also provides connector apparatus or connection of methods which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

Further aspects of the invention, which should be considered in all its novel aspects, will become apparent from the following description.

DRAWING DESCRIPTION

Figure 2:
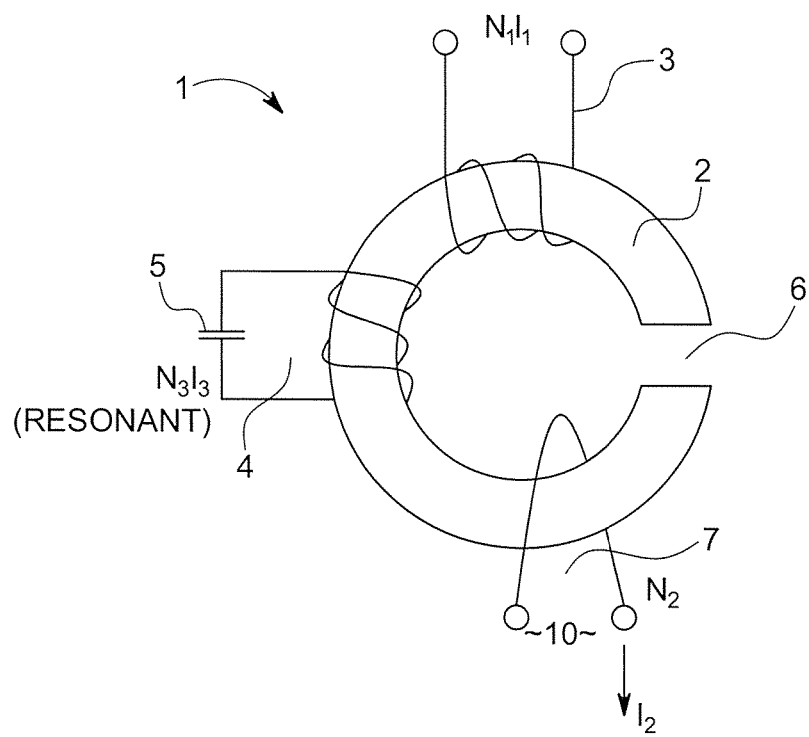
Figure 3:
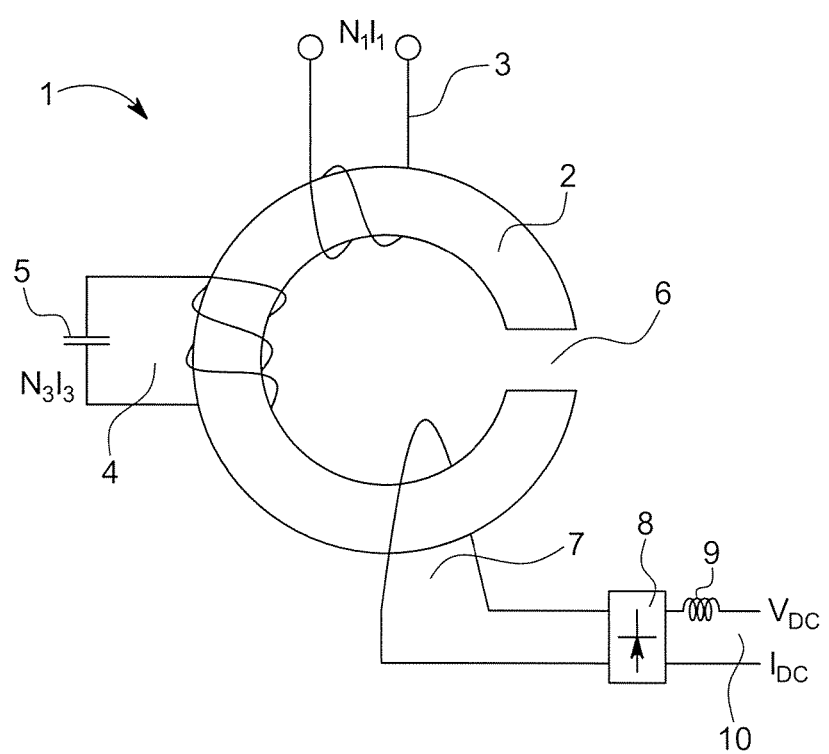
Figure 4:
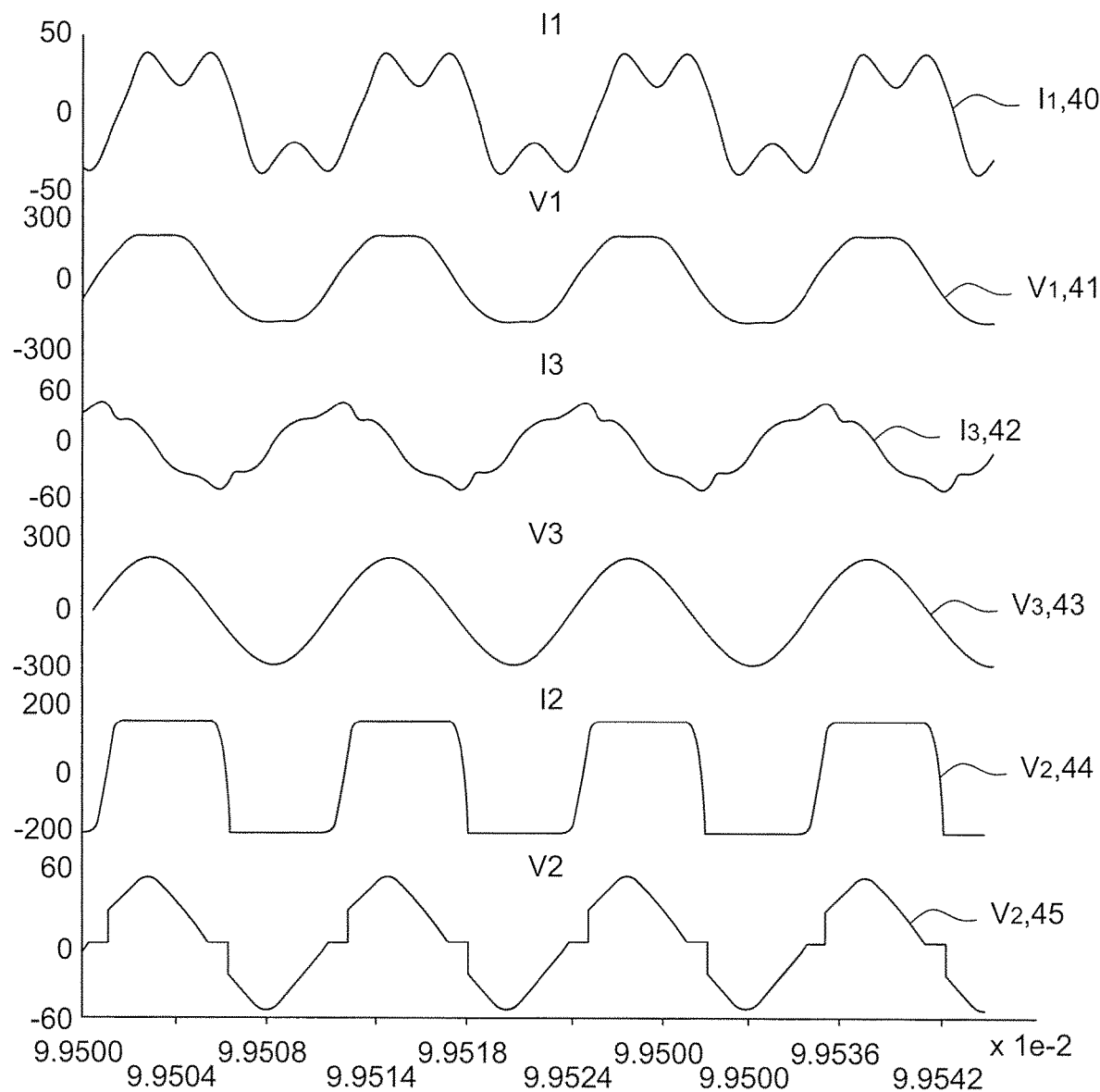
Figure 5:
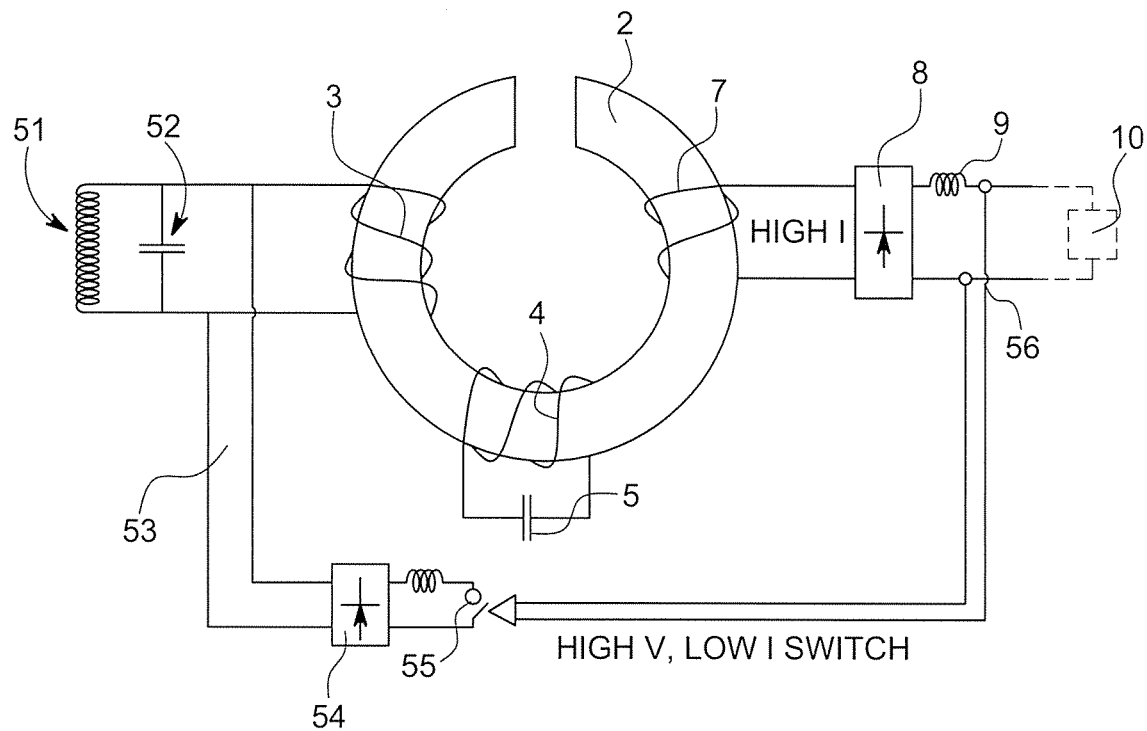
Figure 6:
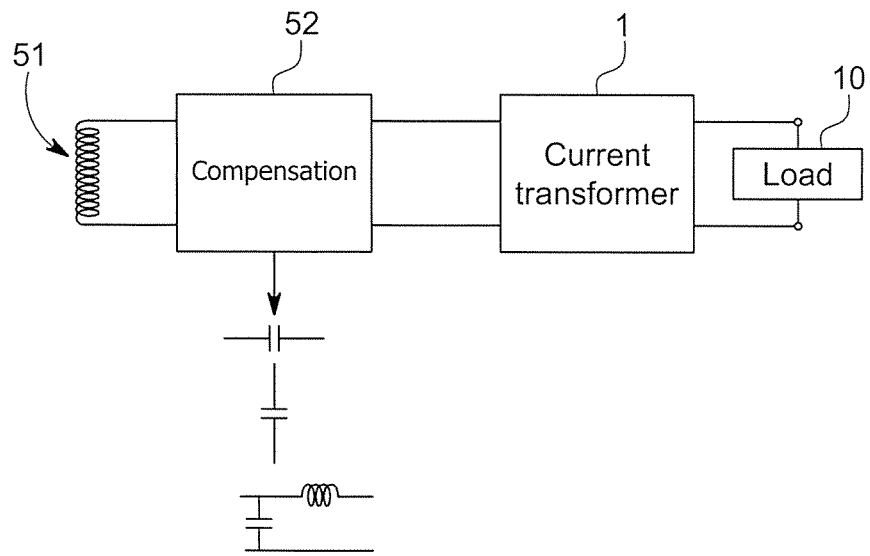
Figure 7:
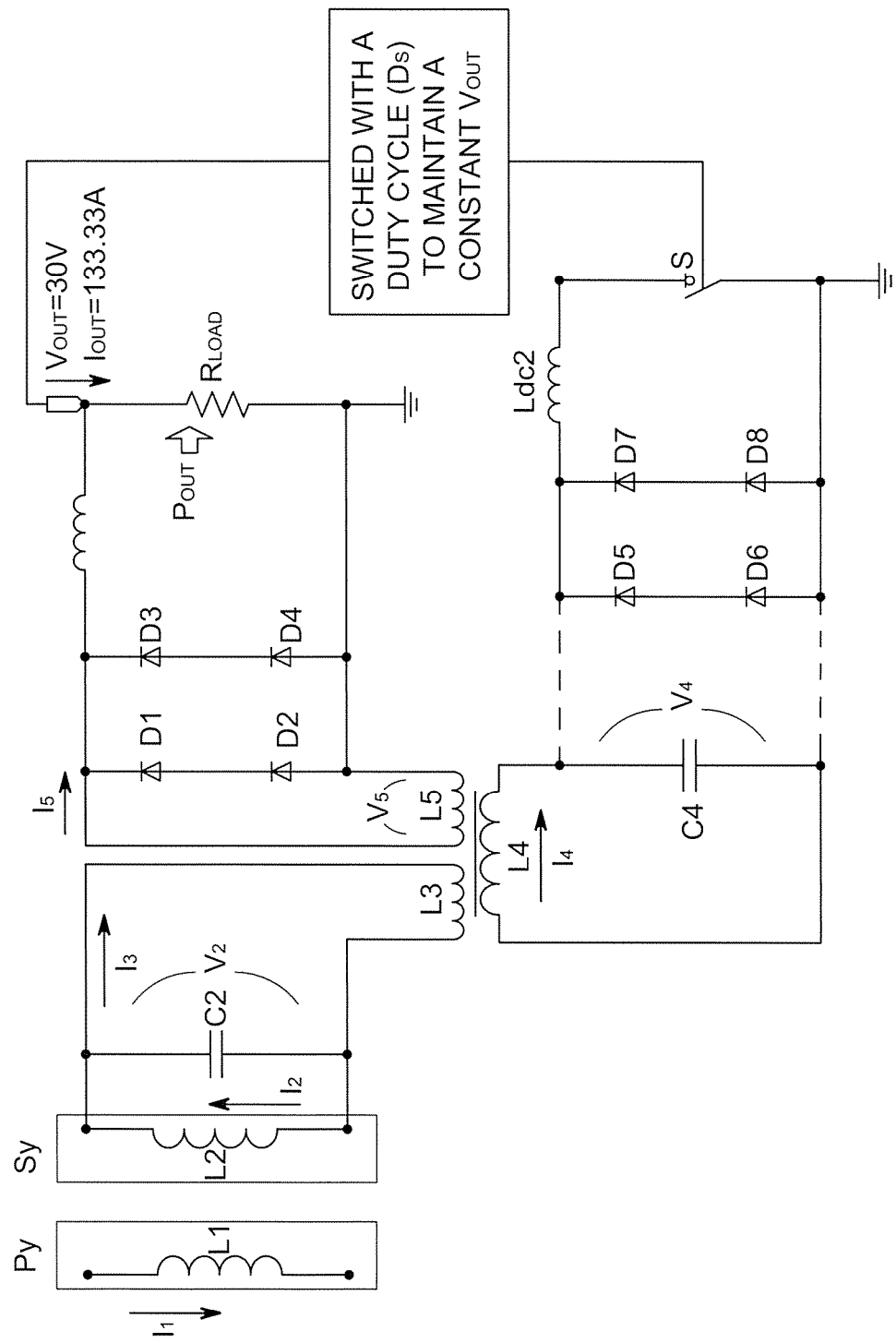

A number of embodiments of the invention will now be described by way of example with reference to the drawings in which:

FIG. 1 is a prior art diagram of a current transformer.
FIG. 2 is a first embodiment of the present invention
FIG. 3 is a second embodiment of the present invention
FIG. 4 shows waveforms associated with an embodiment of the present invention.
FIG. 5 is an embodiment of the invention as an IPT pickup.
FIG. 6 is an embodiment of the invention as an IPT pickup in block form.
FIG. 7 is a circuit diagram of an example of a parallel tuned IPT system which includes a controlled current multiplier.

DETAILED DESCRIPTION OF THE DRAWINGS

Throughout the description like reference numerals will be used to refer to like features in different embodiments.

FIG. 2 shows an embodiment of a current multiplier 1. The apparatus 1 has two windings N1 and N2 that can be any ratio (number of windings on N1 vs number of windings on N2). In the shown embodiment the primary winding 3 (e.g. the winding which is providing power to the circuit) is considered to be N1 and the secondary winding 7 (e.g. the winding drawing power to the circuit or connected to the load, where the load may be any output, or a representative output such as a DC voltage or resistance) is considered to be N2. However the number of turns on each winding can be varied. The windings are wound around a toroidal core 2 which is preferably made of a magnetically permeable material, such as ferrite. However an association between the windings that allows or encourages the flow of a magnetic field may be suitable. Although the core is shown as a toroid this shape is not required and other suitable paths for the core may be chosen or the shape or size of the toroid (e.g. diameter, thickness of ring, circular, elliptical) may be varied.

In a first example the primary coil 3 may have five windings and the secondary coil 7 may have a single winding. It may be advantageous for the secondary winding to have a single turn because, for high power applications the winding is typically wound with large diameter wire which is difficult to shape. In an embodiment of the invention the primary coil may have less than 20 windings and the secondary coil may have less than 5 windings. In a current transformer as in FIG. 1 the skilled person would then consider the ideal transformer ratio was 1:5 so that if I1 was 20A the ideal I2 (for a 1:5 ratio) would be a current of 100A. In a preferred embodiment of the system the current is provided and drawn as a current source, this is because current multiplier works better with a current source because the input current is known.

However the embodiment of FIG. 2 would not operate in this way, except with the use of a third winding, the resonant winding 5. The operation is not equivalent to a typical current transformer because there is an air-gap 6 in the core 2. The air-gap means that the inductance values of the core are very low and this typically makes it impractical for transformers. Secondly low turns ratios like 1:5 reduce the magnetising inductances of the transformer making it impractical. In response to I1 the core will get some flux in it which will produce a small voltage across N2 and if this is terminated in a load there will be a small voltage produced across that load.

A resonant circuit 4, with an impedance 5 attached to a winding allows the circuit to respond to the small flux. The winding may have a variable number of turns, but typically has more turns than either the primary or secondary winding. The impedance 5 is typically a capacitor, however the circuit is not limited to a capacitor and various ways of forming a capacitance may be used. With a resonant winding the flux in the core will Q up, or increase, as the resonance builds. The build-up of the flux will depend on the resonance of the resonant winding. Flux from the input, current source, or primary winding 3 is the input to the circuit and does not change. Therefore as I3 increases the output current to the secondary or output coil 7 increases. This resonance of the resonant winding, or third winding, is driven by the difference between N1I1 and N2I2 (that is the difference between the input and output windings or ampere turns.

We can consider the resonant winding 4 acting as an integrator so that the current in N3 increases until the difference between the winding ratio between N1I1 and N2I2 falls to zero, because I2 increases. When equivalence between N1I1 and N2I2 is reached the circuit stops increasing and continues in that steady-state condition (e.g. in the case described above I2 is equal to 100 amps, more generally with N1I1 and N2I2 equal). This is equivalent to an ideal current transformer condition. The resonant winding is designed to resonate at substantially the same frequency as the power supply, or input power from the primary winding 3. For example, the resonant winding could operate at the resonant frequency of an IPT pick-up.

When these resonant frequencies are substantially the same, or at least similar (for instance within at least 10% or more preferably 5% or 1%), the induction and loading of the windings are proportional to the square of the number of turns of the winding. In this circumstance the circuit having the most turns (e.g. the resonant winding) is most closely coupled with the core. The resonant winding does not receive power (except losses that exist) because there is no real load element in that part of the circuit, but it does build up resonant vars. Thus the resonant winding transfers energy (as opposed) to power, acting as an integrator by absorbing energy from the primary coil, and supplying energy to the output coil, as required. The vars of the resonant winding help drive the multiplier to keep the circuit functioning in the presence of harmonics or non-linearities. Because it is most closely coupled with the core if the secondary attempts to draw more power the energy will be drawn from the resonant winding. Energy is stored by the resonance in the coil, capacitance and the air gap in the permeable material.

This acts to reduce the harmonic load on the primary winding caused by the secondary winding. Because the resonant winding draws reactive power (except for losses) the system provides all power transfer is between the tuned pickup and the output load.

The ratio between the input and output can be increased or decreased by changing the number of turns in the primary and/or secondary windings. The balance point may also be sensitive to the coupling of N1 and N2. I.e. if they are not coupled in the core to the same extend the balance point may vary.

FIG. 2 also shows an embodiment of the invention in which each of the coils is associated with a permeable material which in this example comprises a toroidal core. It should be understood that the invention is not limited to a toroidal core and that a cylindrical or flat core may be useful in some circumstances. It should also be understood that the coils may in some embodiments not be wound around the permeable material. However the toroidal core allows a reasonable coupling factor, of for example 0.8 or 0.9, between the coils.

Preferably the windings have relatively low numbers of turns so as not to be tightly coupled, unlike current transformer technology. This ensures that few turns are required of the windings, especially when large power requires thick winding wires, as well as ensuring that none of the coils has a much higher voltage. In a particular embodiment the input coil has three or four turns, the output coil 1 turn and the resonant coil has 10 to 15 turns. This helps the output coil (or secondary coil 7) to have a high current, and the resonant coil to have a reasonable voltage (e.g. approximately 3-5 times that of the input). In a preferred embodiment the windings coils are spread around the toroidal core. However in other embodiments the windings 3, 4, 7 may overlap, or be adjacent. When overlap is present the windings will be more closely coupled and the windings will have a more controlled effect on each other. In some embodiments it may be desirable, for instance, to add further windings to the system. This may allow different resonant circuits to be used, or different control methods or outputs.

FIG. 3 shows an embodiment of the invention in which the current multiplier is combined with a rectifier. The current multiplier acts as described with respect of FIG. 2. A rectification means, such as a diode rectifier 8 has been introduced to the circuit. A person skilled in the art would understand that alternative rectification means would also be suitable. An inductor 9, preferably small, has been added to the secondary or output winding 7. In this embodiment the resonator winding may be viewed as acting as an integrator. In part it acts to cancel, or reduce, the effects of any non-linearity in the circuit. This is because the resonant winding is designed or adapted to resonate at the same frequency as the input power frequency. Therefore the central or resonant frequency can become dominant over any non-linearity or harmonics. Because the input power is resonant we choose a resonant winding which is resonant at substantially the same frequency. This adapted the multiplier so that the input does not need to be switched to maintain a constant, or desired state, in the multiplier.

The reduction in the non-linearities gives the circuit an advantage compared with other rectifiers. All rectifiers require reactive power, or vars. Reactive power acts to correct the power factor in the form of displacement power factor that is always present with a rectifier. Reactive power also supplies the harmonics that the rectifier will need to function correctly. To explain further we will now consider an ideal rectifier that must create a square wave signal, which includes high frequency harmonic components. As the resonant frequency is a constant frequency the rectifier must draw these harmonics from another source, or produce a poor waveform. In the circuit of FIG. 3 the vars can be supplied by the resonant circuit with limited effect on the first harmonic. This is because the current multiplier supplies the first harmonic (or resonant frequency) as a current source set by the resonant frequency. However the resonant frequency is not dominant at the harmonic frequencies and the rectifier can draw these as a voltage source from the impedance (e.g. the capacitor 5) of the resonant winding, without a large effect on the first harmonic.

FIG. 4 shows the primary winding waveforms 40 41, resonant winding waveforms 42 43 and secondary winding waveforms 44, 45. The waveforms show that an embodiment similar to FIG. 3 can supply a relatively clean DC output without introducing harmonics on the input (which may, for instance, reduce the efficiency of a resonant pick-up). This effect is aided by the circuit comprising very low numbers of turns on the windings and an air-gap in the core. The air gap means that the inductance of the output N2 winding is very small and the vars can be supplied by the resonant winding to give no harmonic or var loading on the primary N1, and very little harmonics on the DC output. These are highly desirable features in a high power rectifier.

First considering the input current 40 and voltage 41 waveforms we note that a harmonic is clearly present in the signal distorting the sinusoidal form. However the distortion is relatively limited. In contrast the output current 44 (still oscillating between positive and negative DC values) has been substantially flattened, and must require further harmonics. The output voltage 45 shows clamping effects. Although the conduction angle appears to be large the clamping is likely due to the size of the inductor 9 on the output and reduction is possible by reducing the size of the inductor. Looking at the current 42 and voltage 43 waveforms for the resonant winding the distortion due to the production harmonics is clear in the current waveform 42. This is an advantage because the resonant circuit is not directly connected to the input and therefore any harmonics in the resonant winding have a more limited effect on power transfer in the input circuit.

FIG. 5 shows an embodiment of the invention where the current multiplier 1 is connected or associated with the secondary or pick up of an IPT system. This is an advantageous combination because the pick-up 51 has a resonant or compensation circuit 52 (e.g. a parallel capacitor, or other compensation circuits known in the art) And provides a resonant AC input, typically at substantially constant frequency of between 10-20 kHz. If the resonant winding 4 is also resonating at this frequency the circuit can provide a high current DC output without overly affecting the pick-up efficiency. This is because the resonant winding absorbs many of the harmonic distortions and the switching can be associated with the primary or resonant winding which also reduces the cost of the control, or switching components (as a lower current is required). FIG. 5 shows an example in which the output power characteristics 56 are measured by the control means or circuit and this information is used to control a switch 55 which is connected to the primary coil by a rectifier 54 through an inductor which is needed to limit current during decoupling of the circuit when a parallel tuned compensation circuit is used in 52. The switch at the primary coil can be high voltage, low current switch. The switch could also be placed on the resonant winding 4, however the effect of the switch on the resonator is harder to predict because the resonator is relatively loosely coupled to the primary coil and complete turn off may not be achieved. This avoids switching the high current circuit.

FIG. 5 also demonstrates that the primary and resonant windings will see an impedance from the remaining windings. The modified impedance may have to be taken into account when designing elements of the circuit. However in most cases because the resonant winding has the most turns around the core it is the best coupled to the circuit and will dominate any transferred impedance.

FIG. 6 shows a block diagram version of FIG. 5 in which the pick-up coil 51 is connected to a compensation network 52 with various options possible that include but are not limited to parallel, series or LCL tuning networks as shown, a current multiplier 1 (as described above) and finally a load 10. The compensation can be any compensation network known in the art. In particular a current source (parallel compensation) is preferred although a voltage source is also possible using a series tuned compensation winding for 52. In the voltage source case the output of rectifiers 54 and 8 in the decoupling control and load circuits would ideally have capacitors shunted across them before the filter inductor. A current source may be preferable because it is less dependent on the load which helps to avoid saturation of the magnetic circuit and make tuning of the circuit more straightforward.

The operation of FIG. 6 is relatively simple. A measurement device is located in the system, preferably at or near the load 10 to measure the electrical characteristics such as voltage or current. A control means (for instance a circuit, logic system or microprocessor, or simply a controlled switching device and a sensor), receives the electrical characteristic/s from the measurement device or sensor and compares them to a desired value. The control means then controls a switching means, or similar control means which is preferably attached to the primary or resonant winding. The switching means may be a switch such as a MOSFET. By switching the switch at a high voltage, low current position of the circuit the switching losses can be reduced without reducing the quality of the output power.

In an alternative viewpoint the system can be understood as a power transfer system. In this case real power is transferred from the input winding 3 to the output winding 7. The resonant winding 4 does not receive real power (ideally) and holds only reactive power. This can be seen from the waveforms which show the power in the resonant winding to be 90 degrees offset. Therefore the system allows the resonant winding 4 to be coupled to the multiplier so as to provide a support to the transfer of power between the input and output coils, and to use a resonance to filter harmonics from the circuit.

Referring to FIG. 7, an example of a possible IPT system incorporating a controller current multiplier that includes the concepts described in the other embodiments referred to above, is shown.

In this example a 3-way coupled circuit is used on the secondary side, as shown in FIG. 7, consisting of L3, L4 and L5. Here a suitable permeable member, such as a gapped toroidal core is proposed to be used for winding the three coils. In addition, the coupled circuit consisting of L3 (the input side) and L5 (the load side) are supposed to be designed such that it behaves as a voltage step down and current step up with a transformation ratio of 1 to 5. Here, L5 is supposed to consist of a single turn given the bigger cross sectional area required to support the large load current, and hence to achieve a 1 to 5 ratio L3 is supposed to have 5 turns. Whereas, the coupled circuit consisting of L3 and L4 (the intermediate decoupling side) is supposed to behave as a voltage step up and current step down by a transformation ratio of 1 to 2. The reason for this is to reduce the current in decoupling switch and hence reducing the associated losses. To achieve this 1 to 2 ratio between L3 and L4, the number of turns used in L4 will be double that of L3 (i.e., 10 turns).

For the simulations estimated values for L3, L4 and L5 were used. Based on experience, it is known that the inductance of a single turn winding wound on the gapped toroid planned to be used for this circuit has an inductance of around 0.25 uH. This value was used to estimate the self-inductances for all three winding (i.e., L3=6.25 uH, L4=25 uH and L5=0.25 uH). In addition, given the L4 was assumed to be the winding physically wound in the middle of the toroid, so it was assumed to have a coupling of 0.9 with the other two windings (i.e., M34=11.25 uH and M45=2.25 uH). Whereas, L3 and L5 being the outer windings were assumed to have a coupling of 0.8 (i.e., M35=1 uH).

The secondary pickup (L2) is parallel tuned and hence behaves as a current source, ideally maintaining $I_3$ constant. Therefore, the current $I_4$ built up due to the resonance of L4 and C4 shall help boost the current $I_5$ being supplied to the load.

As shown in FIG. 7, a rectifier with an output series DC inductance (i.e., D5 to D8 and Ldc2) is used in a practical circuit to use a DC switch while keeping the transient current through the switch in check. As described above, the resonant winding L4 can be used to improve the quality of the power delivered to the load. Also, if the switch S (and related circuitry) is included across C4 in the resonant circuit, then a control means is adapted to control the current multiplied output to the load while being associated with, in this case, the resonant winding.

From the foregoing it will be seen that a current multiplier is provided which improves the ability to transfer high power to a load.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A current multiplier comprising:
   a primary winding associated with a power source;
   a secondary winding associated with a load;
   a resonant winding associated with a capacitance; and
   a control means for controlling an output of the secondary winding to the load, the control means associated with the primary or resonant winding;
   wherein the control means is configured to receive a signal based, at least in part, on the impedance reflected by the current multiplier and/or the load voltage.

2. The current multiplier as claimed in claim 1 wherein the primary, secondary and resonant windings are wound around a magnetically permeable material, and the magnetically permeable material includes a gap.

3. The current multiplier as claimed in claim 1 wherein each of the primary, secondary and resonant windings is spaced apart from one another.

4. The current multiplier as claimed in claim 1 wherein the capacitance associated with the resonant winding is adapted to resonate with an inductance of the resonant winding at a resonant frequency substantially equal to an operating frequency of the power source.

5. The current multiplier as claimed in claim 1 wherein the power source is a secondary of an inductive power transfer (IPT) system.

6. The current multiplier as claimed in claim 5 wherein the secondary comprises a resonant circuit, and the resonant circuit operates at a substantially fixed frequency.

7. The current multiplier as claimed in claim 1 wherein the control means comprises a rectification means and/or a sensor.

8. The current multiplier as claimed in claim 1 wherein the secondary winding and the resonant winding have a common ground and the control means is adapted to control the output of the secondary winding to the load by switching the resonant winding.

9. A current multiplier comprising:
   a primary winding associated with a power source;
   a secondary winding associated with a load;
   a resonant winding associated with a capacitance, wherein the capacitance is adapted to resonate with an inductance of the resonant winding at a resonant frequency substantially equal to an operating frequency of the power source; and
   a control circuit configured to control an output of the secondary winding to the load, the control circuit associated with the primary or resonant winding.

10. The current multiplier as claimed in claim 9 wherein the control circuit is configured to receive a signal based, at least in part, on the impedance reflected by the current multiplier and/or the load voltage.

11. The current multiplier as claimed in claim 9 wherein the control circuit is configured to obtain an electrical characteristic associated with the secondary winding, and control the output of the secondary winding based, at least in part, on the electrical characteristic, wherein the electrical characteristic associated with the secondary winding is selected from the group consisting of: a current, voltage, or a measure of the power supplied to the load.

12. The current multiplier as claimed in claim 9 wherein the primary, the secondary and the resonant windings are wound around a magnetically permeable material, and the magnetically permeable material includes an air gap.

13. The current multiplier as claimed in claim 9 wherein the secondary winding and the resonant winding have a common ground, and the control circuit is configured to control the output of the secondary winding to the load by switching the resonant winding.

14. The current multiplier as claimed in claim 9 wherein the power source is a secondary of an inductive power transfer (IPT) system, the secondary comprises a resonant circuit, and the resonant circuit operates at a substantially fixed frequency.

15. The current multiplier as claimed in claim 12 wherein the current multiplier comprises a further winding associated with the magnetically permeable material, and the further winding is connected to at least one of: another resonant circuit or a control circuit.

16. A current multiplier comprising:
a primary winding associated with a power source;
a secondary winding associated with a load;
a resonant winding associated with a capacitance; and
a control circuit configured to control an output of the secondary winding to the load, the control circuit associated with the primary or resonant winding;
wherein the power source is a secondary of an inductive power transfer (IPT) system, and the secondary comprises a resonant circuit.

17. The current multiplier as claimed in claim 16 wherein the primary, secondary and resonant windings are wound around a magnetically permeable material, the magnetically permeable material is substantially toroidal, and the magnetically permeable material includes an air gap.

18. The current multiplier as claimed in claim 16 wherein the capacitance associated with the resonant winding is adapted to resonate with an inductance of the resonant winding at a resonant frequency substantially equal to an operating frequency of the power source.

19. The current multiplier as claimed in claim 16 wherein the control circuit is configured to receive a signal based, at least in part, on the impedance reflected by the current multiplier and/or the load voltage.

20. The current multiplier as claimed in claim 16 wherein the secondary winding and the resonant winding have a common ground, and the control circuit is adapted to control the output of the secondary winding to the load by switching the resonant winding.

* * * * *